April 20, 1926.

W. A. WILLIAMS

ROTARY GASOLINE MOTOR

Filed March 8, 1923

INVENTOR.
WILLIAM A. WILLIAMS.
BY HIS ATTORNEY.

April 20, 1926.  
W. A. WILLIAMS  
ROTARY GASOLINE MOTOR  
Filed March 8, 1923  
1,581,148  
2 Sheets-Sheet 2

INVENTOR.  
WILLIAM A. WILLIAMS.  
BY HIS ATTORNEY

Patented Apr. 20, 1926.

1,581,148

UNITED STATES PATENT OFFICE.

WILLIAM A. WILLIAMS, OF MINNEAPOLIS, MINNESOTA.

ROTARY GASOLINE MOTOR.

Application filed March 8, 1923. Serial No. 623,635.

*To all whom it may concern:*

Be it known that I, WILLIAM A. WILLIAMS, a citizen of the United States, residing at Minneapolis, in the county of Hennepin and State of Minnesota, have invented certain new and useful Improvements in Rotary Gasoline Motors; and I do hereby declare the following to be a full, clear, and exact description of the invention, such as will enable others skilled in the art to which it appertains to make and use the same.

This invention relates to a rotary engine adapted to be driven by steam or other fluid or gaseous medium. It has long been recognized that such a rotary engine would be very desirable as the reciprocation and the consequent reversal of the motion of many of the parts in a reciprocating engine would be eliminated. Previous attempts have been made to construct a successful rotary engine but trouble has usually been experienced in properly sealing the compressed fuel and in properly regulating the inlet and discharging of the fuel.

It is an object of this invention, therefore, to provide a rotary engine having a substantially cylindrical chamber in which a rotating piston is mounted which preferably is eccentric in shape and which is propelled in the cylinder by the expulsion or burning of the fuel.

It is a further object of the invention to provide an engine of the internal combustion type having such a cylindrical chamber and piston together with movable means engaging the piston and dividing the space between the same and the cylindrical wall into two portions, whereby the fuel can be admitted at one side of the piston, compressed by the other side thereof during the rotation of the piston and then fired and again delivered to the first side of the piston.

It is still another object of the invention to provide an inlet port for the fuel at one side of the piston, to provide a compression chamber into which the fuel is compressed by the piston and to provide means for firing and delivering the fired fuel into the cylindrical chamber through the fuel inlet port.

It is a still further object of the invention to provide such an engine having a cylindrical chamber, a rotating piston therein, a compression chamber, and inlet compression and exhaust ports leading from said chamber, which ports are controlled by valves operated by mechanism driven from the piston shaft, the fuel inlet port also serving as a port through which the fired gases are discharged into the cylinder against the piston.

It is also another object of the invention to provide such a rotary internal combustion engine in which a charge of fuel is taken into the said cylindrical chamber at each third revolution of the piston.

It is also an object of the invention to provide the rotating piston and the movable section of the cylinder wall with suitable and efficient packing members.

These and other objects and advantages of the invention will be fully set forth in the following description made in connection with the accompanying drawings in which like reference characters refer to the same parts throughout the different views, and in which, Fig. 1 is a central longitudinal vertical section through the engine also showing a carbureter attached thereto;

Fig. 3 is a view in side elevation of the piston, a part thereof being shown in section;

Fig. 4 is a fragmentary vertical section through the piston and cylinder wall taken on the line 4—4 of Fig. 1.

Figure 1:
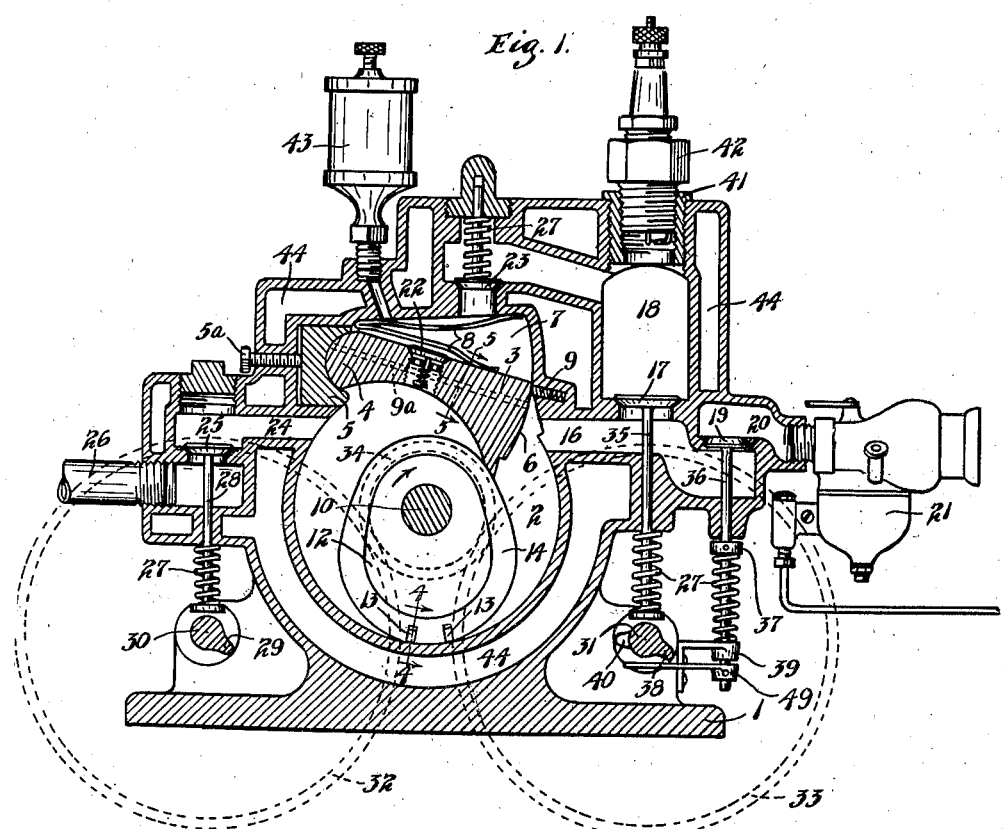

Referring to the drawings, the engine or motor is shown as comprising a frame preferably in the form of a casting and comprising a base portion 1 having a main body portion thereabove in which is formed a cylindrical chamber or cylinder 2. The wall of the cylinder 2 is of circular cylindrical shape and has a movable section member 3 having a rounded portion 4 at one end seated in a similarly shaped recess in a movable block 5, said section being adapted to oscillate about the center of its rounded end 4 on an axis parallel to the axis of the cylinder. The block 5 is movable by a set screw 5ª extending through the frame. The section 3 has an arcuate surface 6 at its front end adapted to fit and move in contact with the inner arcuate surface of an intermediate chamber 7 in which chamber is disposed a bow plate spring 8 normally tending to force the section 3 inwardly of the cylinder or toward the cylinder axis. A spring-pressed packing strip or bar 9 is mounted in the cylinder wall and adapted to press against the arcuate surface 6 of the section 3 to form a tight seal against said surface. Outwardly spring-pressed strips or bars 9a are mounted in the sides of the movable section 3 and adapted to contact the flat side walls of the chamber 7.

A shaft 10 extends axially of the cylinder and is supported in bearings 11 of the cylinder body and said shaft has secured thereto and disposed in the cylindrical chamber 2 a rotating piston 12. In the embodiment of the invention illustrated, this piston is shown as of generally elliptical shape and eccentrically disposed on the shaft 10 with one portion of its surface rotating in engagement with the wall of the cylinders 2. Said cylinder has disposed in its outer surface substantially at or adjacent the point where it engages the cylinder wall, spring-pressed packing strips 13 which are constantly urged outwardly into engagement with said wall. The ends of the cylindrical chamber 2 and the sides of the piston are formed with plane surfaces and the sides of the piston are equipped with outwardly and spring-pressed annular packing strips 14, which strips are thus pressed constantly in engagement with the end walls of the cylinder 2.

Figure 2:
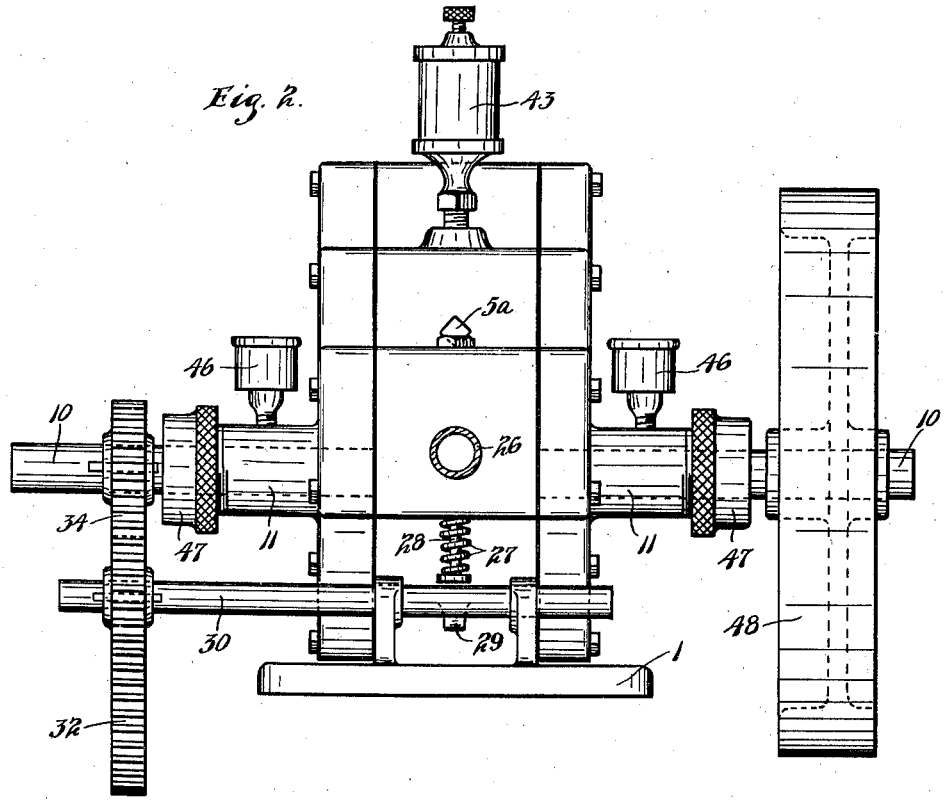
Fig. 2 is a view in end elevation of the engine.
Figure 5:
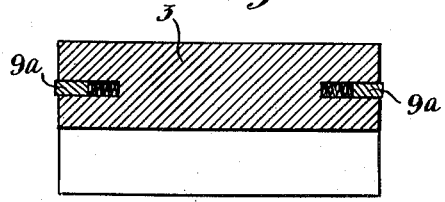
Fig. 5 is a section through the movable part of the cylinder wall taken on the line 5—5 of Fig. 1.

As clearly shown in Fig. 1, the movable section 3 on the cylinder wall is held in engagement with the surface of the piston 12, which piston is adapted to rotate in a clockwise direction and the space between the piston and the walls of the cylinder 2 is thus divided into two portions. At a point adjacent the movable section 3 and beyond the same in the direction of rotation of the piston is a passage 16 terminating in a port in the cylinder wall, which passage communicates through an opening controlled by a valve 17 with a compression chamber 18. The passage 16 also communicates through an opening controlled by a valve 19 with an inlet chamber or conduit 20 adapted to be connected to the source of fuel supply, such as a carbureter 21. The section 3 has an opening therethrough threaded to receive the carrying frame of a valve 22 which is spring-pressed to closed position to control the opening affording communication between the cylinder 2 and the intermediate chamber 7. The chamber 7 communicates through an opening controlled by a valve 23 with a passage communicating with the compression chamber 18. A passage 24 forms a port communicating with the cylinder 2 and this passage communicates through an opening controlled by the valve 25 with an exhaust chamber from which leads an exhaust pipe 26. The valves 17, 19, 23 and 25 are urged to closed position by coiled springs 27. The valves 22 and 23 are moved to open position by the pressure of the gases. The valve 25 carries a plunger 28 which is surrounded by one of the springs 27, which plunger has a head against which its spring is seated and which head is adapted to be engaged by a cam 29 on a cam shaft 30. The cam shaft 30 and the cam shaft 31 are driven through gears 32 and 33, respectively, engaging a gear 34 on the piston shaft 10, which gears are indicated in dotted lines in Fig. 1. The valves 17 and 19 are also provided with plungers 35 and 36 and the latter has secured thereto, a collar 37 against which the spring 27 of said valve seats and a plate 49 is adapted to be contacted by a cam 38 on the cam shaft 31. The plunger 36 is guided at its lower end in a small bracket 39 secured to one side of the frame. The plunger 35 has a head at its lower end against which its spring 27 seats and this head is adapted to be engaged by a cam 40 also mounted on the cam shaft 31. An opening is formed through the top of the frame into the combustion and compression chamber 18 which is threaded to receive a bushing 41, which bushing is interiorly threaded and adapted to receive a spark plug 42. An oil cup 43 is illustrated and delivers oil into the intermediate chamber 7 from whence the same can pass into the cylinder 2. It will be noted that the frame is provided with passages 44 about the cylinder, compression and exhaust chambers, which passages are adapted to have water circulated therethrough for keeping the engine cool. Oil cups 46 are shown secured in the bearings 11 for the purpose of lubricating the piston shaft, and the bearings 11 are provided with stuffing boxes of any well known or desired type and are threaded to receive the stuffing box caps or followers 47 so that the shaft 10 is efficiently packed. The shaft 10, as shown in Fig. 2 is extended at each side of the bearings 11 and carries at one end the gear 34 and at its other end a fly wheel 48 which may also comprise a belt wheel for transmitting power from the motor.

The operation of the motor is as follows:

The gears 34 and 32 and 33 are in the ratio of 1 to 3 so that the cam shafts 30 and 31 make one revolution to three revolutions of the shaft 10. The cams on the shafts will be so arranged that as the long radius of the piston begins to pass the free end of the movable section 3, the inlet valve 19 will be opened and as the piston continues to move in a clockwise direction, a charge of fuel will be drawn into the cylinder from the carbureter 21, and this charge will continue to be drawn in until the long radius of the piston is in vertical position or slightly past the vertical. The inlet valve 19 will now close and the exhaust valve 25 and the valve 17 will also be closed. The piston now makes another revolution and the fuel which has been drawn into the cylinder 2 is moved ahead of the piston and compressed in the portion of the cylinder chamber which is ahead of the piston or between the left side thereof, as seen in Fig. 1, the cylinder wall and the inner surface of the movable section 3. The movable section 3 being held down against the piston surface, the fuel as it is compressed, lifts valves 22 and 23 and passes into the compression chamber 18. As the piston revolves and as its long radius approaches its vertical position the movable section 3 is raised and the chamber 7 is substantially closed, the inner surface of the movable section 3 then forming part of the circle of the cylinder wall. Substantially all of the fuel charge is thus forced into the compression chamber 18. The long radius of the piston again passes the end of the movable section 3 and, at about the same time, the compressed fuel charge is fired by the spark plug 42, a suitable firing or ignition system being provided. Such a system would require only a movable contact on one of the shafts 31 engaging a fixed contact in every third revolution of the piston shaft. As the charge in the compression chamber is fired, valve 17 is opened and the burned and expanded gases pass into the passage 16 and through the inlet port into the cylinder 2. The force of the gases is thus directed against the side of the piston and these gases will occupy the portion of the chamber at the right hand side of the piston, as seen in Fig. 1, and the piston will thus be urged and moved in a clockwise direction. It will be noted that the gases formed by the combustion or explosion of the fuel cannot pass the movable section 3 and in fact, act only to hold the same in firm engagement with the piston 12. The piston 10 is thus thrown quickly around by the expanded gases and as the long radius of the piston again passes the end of the movable section 3 and the inlet port 16, the valve 19 will again be opened, the valve 17 closed and a new charge of fuel will be drawn into the cylinder. As the inlet valve again opens the exhaust valve 25 will also open and the burned gas in the cylinder will be moved ahead of the piston and forced out through the passage 24 and the exhaust pipe 26. This scavenging or forcing out of the exhaust gases will continue until the long radius of the piston passes the port of the passage 24 so that there will be practically a complete expulsion of the burned fuel. A new charge of fuel having been drawn into the cylinder, the same will be again fired and the cycle of operation described will be repeated. It will be noted that the valves 22 and 23 will be held closed during the explosion in the compression chamber 18 and that the valve 17 will be positively held open at this time. The passage of the expanded gases past the piston will be effectively prevented by the packing strips 13 and 14 and the passage of the compressed fuel past the piston will also be prevented by these strips and by the strips 9 and 9ª on the movable section 3. The exhaust valve 25 will, of course, be closed during the compression of the fuel and in the practical embodiment of the invention, the passage 24 is quite short so that practically no fuel passes thereinto.

From the above description it is seen that applicant has provided a simple and efficient form of rotary internal combustion or other engine. The objectionable reciprocating pistons are eliminated and yet the force of the explosion is effectively utilized. The inlet passage 16 is so disposed that the incoming gases from the firing of the fuel will press against the end surface 6 of the movable section 3. While said section will be pressed somewhat against the piston there will be no great downward pressure of said section against the piston to retard the rotation of the latter. The various operations of the parts are all positively controlled and the action of the various parts in the cycle of operation can be accurately adjusted. It will be understood that the cams operating the valves will be designed and adjusted to give the most efficient operation. The motor is exceedingly small and compact for the power generated and the fuel used and is very efficient in the consumption of fuel and oil in comparison with the power generated. The device has been actually built and used in practice and its successful operation demonstrated.

The engine can be run as a steam engine by using the compression chamber as an inlet chamber and operating only the valves 17 and 25 as inlet and exhaust valves.

It will, of course, be understood, that various changes may be made in the form, details, arrangement and proportions of the parts without departing from the scope of applicant's invention, which, generally stated, consists in the matter shown and described and set forth in the appended claims.

What is claimed is:

1. A rotary internal combustion engine having in combination, a cylindrical chamber, a shaft passing axially therethrough, a piston rotatable in said chamber and secured to said shaft, said piston having a surface moving in engagement with the chamber wall, a movable section in said wall in yielding engagement with said piston and dividing the space between said piston and wall into two portions, a compression chamber at one side of said cylinder into which a charge is compressed by said piston, said movable section having a valve-equipped opening therethrough through which said compressed charge passes to said compression chamber, a passage connecting said compression chamber and cylinder in advance of said movable section in the direction of rotation of said piston and means for admitting fuel into one of said portions to be compressed by said piston.

2. A rotary internal combustion engine having in combination, a cylindrical chamber, an eccentric elliptical piston rotatable therein having one side in engagement with said cylinder wall, said wall having a section with one side in yielding engagement with said piston and dividing the space between said eccentric and wall into two portions, an inlet passage into said cylinder, a positively actuated valve controlling said passage, and exhaust passage beyond said inlet passage, said section having a valve controlled opening therethrough, a chamber at the outer side of said section, a compression chamber at one side of said cylinder, a spring controlled valve between said chambers, and a positively controlled valve between said compression chamber and said inlet passage.

3. A rotary internal combustion engine having in combination, a cylinder, a radially disposed piston rotatable therein, a movable section in the cylinder wall engaging said piston and oscillatable about one end and about an axis parallel to the axis of the cylinder, a compression chamber at one side of said cylinder, a chamber at the outer side of said section, said section having an opening therethrough into said latter chamber, a spring-pressed valve controlling said opening, and a valve-controlled passage between said chambers.

4. A rotary internal combustion engine having in combination, a radially disposed piston rotatable therein, a movable section in the cylinder wall, a compression chamber, an intermediate chamber between the compression chamber and said movable section, a spring-pressed outwardly opening valve in said movable section opening into the intermediate chamber, and a spring-pressed outwardly opening valve affording communication between said intermediate chamber and said compression chamber.

5. An internal combustion engine having in combination, a cylinder, an eccentric elliptical piston rotatable therein having one side moving in engagement with the cylinder wall, a movable section in said cylinder wall having yielding engagement with said piston and dividing the space between said piston and wall into two portions, a passage opening into one of said portions through the cylinder wall thereof adjacent the point of engagement of said piston and movable section beyond said section in the direction of rotation of said piston, a compression chamber, a fuel inlet chamber, a valve controlled passage leading from the other portion through the cylinder wall to the compression chamber, a valve-controlled opening connecting the first mentioned passage and compression chamber, and a valve controlled passage connecting the first mentioned passage and said fuel inlet chamber.

6. The structure set forth in claim 5, and a valve controlled exhaust passage leading from the last mentioned portion of said space.

7. A rotary internal combustion engine having in combination, a cylinder, an eccentric radially disposed piston rotatable therein having one side moving in engagement with the cylinder wall, a movable section in said wall having yielding engagement with said piston and forming two portions in said cylinder, one at each side thereof, an inlet port opening into said cylinder in one of said portions and an exhaust port communicating with said cylinder in the other of said portions, a compression chamber at one side of said cylinder, a passage leading from said last mentioned portion to said compression chamber, said passage extending through said movable section, spring operated check valves in said passage opening outwardly from said cylinder, a port connecting said compression chamber and said inlet port and a positively opened valve controlling the same.

8. A rotary internal combustion engine having in combination, a cylinder having flat sides, a radially disposed piston rotatable therein having one side moving in engagement with the cylinder wall, an oscillating section in said wall having its free end in yielding engagement with said piston, an inlet port into said cylinder at one side of said section, an exhaust port communicating with said cylinder at the other side of said section, a compression chamber at one side of said cylinder, a chamber at the side of said movable section opposite said cylinder, a passage extending through said movable section into said last mentioned chamber, a check valve in said section normally closing said passage, a passage extending from said last mentioned chamber into said compression chamber, a check valve in said last mentioned passage, said compression chamber having a port communicating with said inlet port, and a positively opened valve controlling the same.

In testimony whereof I affix my signature.

WILLIAM A. WILLIAMS.